United States Patent [19]

Decker

[11] 4,169,545
[45] Oct. 2, 1979

[54] PLURAL COMPONENT DISPENSING APPARATUS

[75] Inventor: Herman W. Decker, Stuart, Fla.

[73] Assignee: Ransburg Corporation, Indianapolis, Ind.

[21] Appl. No.: 820,839

[22] Filed: Aug. 1, 1977

[51] Int. Cl.² ............................................. B05B 7/04
[52] U.S. Cl. .................................. 222/136; 222/145; 222/504; 239/527
[58] Field of Search ............... 222/136, 135, 145, 504, 222/148, 193; 239/400, 404, 412, 414, 527, 417.5, 416.1

[56] References Cited

U.S. PATENT DOCUMENTS

| 3,291,396 | 12/1966 | Walter | 239/428 X |
| 3,437,273 | 4/1969 | Hagfors | 239/414 |
| 3,741,441 | 6/1973 | Eberle | 222/135 |
| 3,790,030 | 2/1974 | Ives | 222/148 X |
| 3,799,403 | 3/1974 | Probst et al. | 222/135 |

FOREIGN PATENT DOCUMENTS 240728  10/1925  United Kingdom ................. 239/414

Primary Examiner—John P. Shannon
Attorney, Agent, or Firm—Merrill N. Johnson; Richard D. Conard

[57] ABSTRACT

A plural component dispensing system includes supplies which furnish first and second components under pressure to a dispensing apparatus having first and second valves, respectively. Each of the valves includes a rotatable valve member in a combination retainer and seat. The valves are connected to first and second pinion gears, respectively, and a rack engages each of the pinion gears. The rack is attached to a piston which is disposed for reciprocation in a cylinder in response to fluid pressure on one side or the other of the piston. Actuation of the piston in a first direction provides paths for component flow through the first and second rotatable valve members and through first and second orifices, respectively, into a mixing chamber. The first and second orifices are disposed to provide impinging streams of the first and second components, the impingement insuring complete and thorough mixing of the components. A nozzle is provided in the mixing chamber opposite the first and second orifices for dispensing the mixed components from the apparatus. When fluid pressure is provided on the other side of the piston, the first and second rotatable valve members are rotated to positions to block the flow of components into the mixing chamber.

17 Claims, 4 Drawing Figures

PLURAL COMPONENT DISPENSING APPARATUS

This invention relates to apparatus for dispensing plural component materials, and particularly to apparatus for mixing and dispensing foams used for packaging and the like.

Polyurethane foam systems of the thermosetting type are typically products of a chemical reaction between a polyol resin base and an isocyanate hardener (Frequently toluene diisocyanate or methane diisocyanate). Each component of the plural component material is by itself generally stable, such that it will remain highly fluid for a considerable length of time, provided it is properly stored. Mixing of the resin and hardener components in the proper proportions, however, initiates a chemical reaction that causes the components to begin to polymerize and generate heat which volatilizes a blowing agent (generally included in one or both of the components). Volatilization of the blowing agent causes the resin to foam. The resin-containing component includes, in addition to the polyol base and the blowing agent (which is frequently Freon 11 or Freon 12), a catalyst, which controls the setting time of the foam, and a surfactant, which controls the size of the foam cells.

A plural component dispensing device of the general type to which the instant invention relates is disclosed in Probst et al, U.S. Pat. No. 3,799,403, issued Mar. 26, 1974. The device of the instant invention constitutes an improvement over the devices of the Probst et al patent, in that the device presented herein is considerably simpler in its construction and operation than devices of the Probst et al type. Further, the device of the instant invention allows additional flexibility in its use. For example, the operator of the device of the instant invention can mix with the components being dispensed a preselected amount of air to achieve a desired spray pattern or amount of atomization. It is further known to bring two components together by directing streams of these components toward each other into a chamber where the components are mixed by virtue of their own turbulence. See, for example, Hagfors, U.S. Pat. No. 3,437,273, issued Apr. 8, 1969 and Krueger, U.S. Pat. No. 3,708,123, issued Jan. 2, 1973. It is further known to provide a piston-and-cylinder arrangement, in which the piston reciprocates in a first direction in response to fluid pressure on one side thereof to drive a mixing and spraying system in a first direction to dispense mixed components, and in a second direction in response to fluid pressure on the other side thereof to close such a mixing and spraying system to terminate dispensing of mixed components. See, for example, Walter, U.S. Pat. No. 3,291,396, issued Dec. 13, 1966.

Reference is here also made to the service manuals for Decker Series RD25, RD45 and RD75 foam processing systems, and particularly to the exploded view of the #2 head subassembly 15597-00 for such systems. These items are available from Decker Industries, Inc., P.O. Drawer R, 5051 South East Federal Highway, Port Salerno, Fla. 33492.

It is an object of the present invention to provide a simple apparatus which is an improvement over devices of the type described in the aforementioned United States Patents.

According to the invention, a plural component dispensing apparatus includes first means for supplying a first component under pressure, second means for supplying a second component under pressure, means for controlling the flow of the first and second components from the first and second means, a chamber for mixing the first and second components, the chamber including first and second orifices from which the first and second components are ejected in first and second streams, respectively. The streams from the first and second orifices impinge against one another at an angle as they exit from the first and second orifices to mix thoroughly. The apparatus includes a nozzle for providing a stream of the mixed components from their point of impingement out of the mixing chamber.

Accordingly to an illustrative embodiment, the control means includes a cylinder, a piston disposed for reciprocation in the cylinder in response to fluid pressure on one side or the other thereof, a trigger for selectively controlling the fluid pressure in the cylinder, a rod attached to the piston, first and second rotatable valves for controlling flow of the first and second components, respectively, and first and second pinion gears connected to the first and second valves, respectively, for controlling them. The rod carries rack means for engaging the first and second pinion gears for controlling them. Each of the valves further includes a rotatable member retainer, each rotatable member including means defining a passageway providing for component flow through the rotatable member to a respective one of the first and second orifices when the rotatable member is in a first orientation and for blocking such component flow when the rotatable member is in a second orientation. Each of the pinion gears includes a stem and means are provided for connecting each of the stems to a respective one of the rotatable members to rotate them.

The cylinder is provided by a hand-held and manipulated housing having a pistol grip handle and a barrel. The valve mechanism is removably supported from the front end of the barrel in a valve plate. An orifice plate which provides the first and second orifices is removably attached to the housing adjacent the valve plate. The mixing chamber is provided by a mixing plate which is removably attached to the orifice plate. The removable features of the valve plate, orifice plate and mixing plate facilitate cleanup, repair and replacement of these components.

According to the illustrative embodiment, the dispensing apparatus further comprises a third orifice and means for supplying a purging medium to the third orifice. The purging medium supply means includes third valve means adjustable to provide a continuous flow of purging medium from the third orifice without regard to the presence of any flow from either of the first or second orifices. The third valve means includes an adjustable nut and a push button, both for controlling flow from the third orifice.

The invention may best be understood by referring to the following description and accompanying drawings which illustrate the invention. In the drawings.

Figure 1:
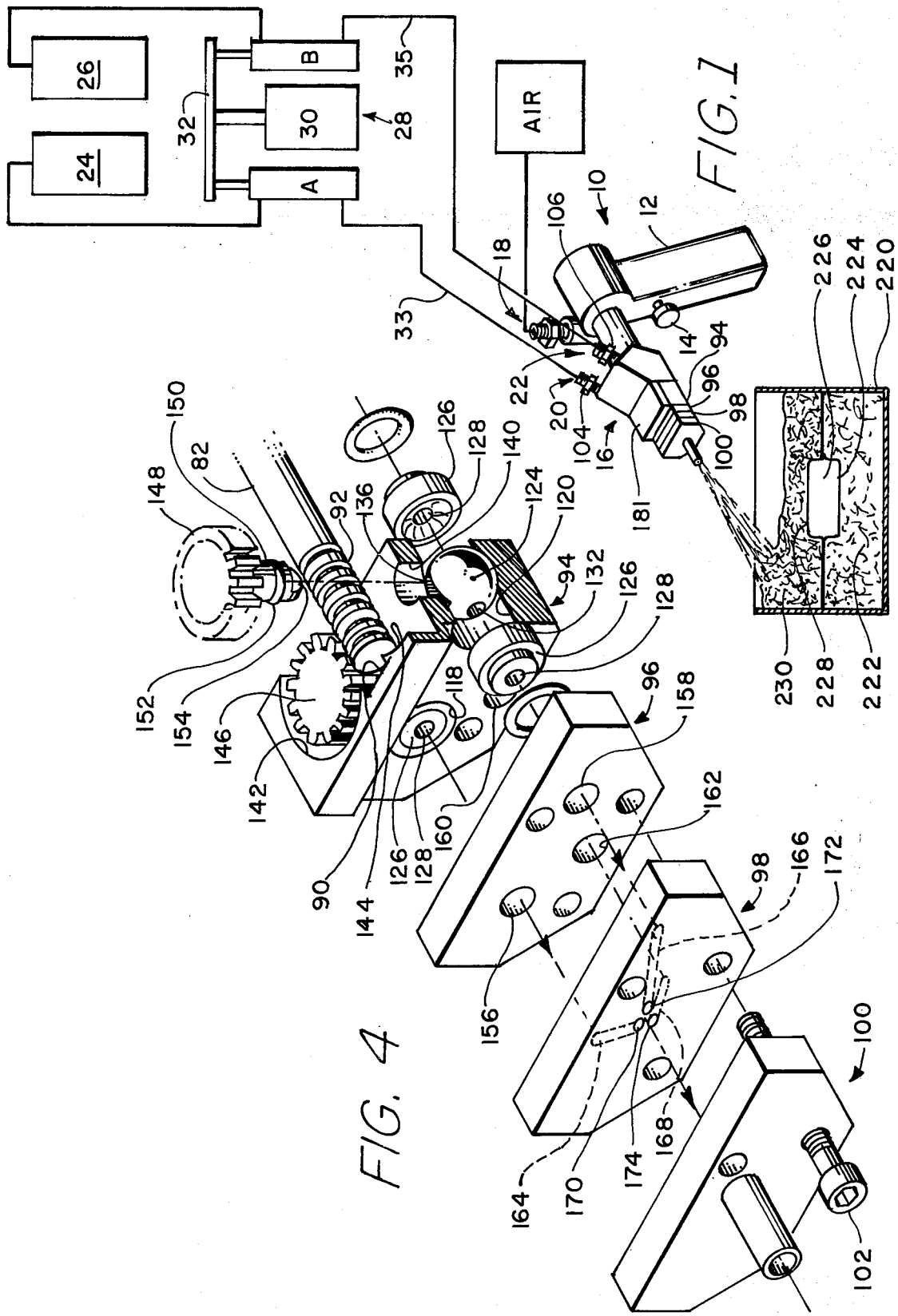
FIG. 1 is a highly diagrammatic view showing a possible use of the apparatus of the instant invention.

The plural component dispensing apparatus 10 of the drawings is, as best illustrated in FIG. 1, a hand-held device including a pistol grip 12 housing a trigger 14, and a frame portion 16 to which the pistol grip 12 is attached. Frame portion 16 includes an inlet 18 for air, an inlet 20 for a component A (for example, the resin component), and an inlet 22 for component B (for example, the hardener). The frame 16 desirably is constructed from cast aluminum or some other material which is not affected by either of the components, and which is capable of supporting moving internal components with relatively little wear. The components A and B are dispensed from tanks 24, 26, respectively, through a pump 28 which, in the illustrated embodiment, includes a hydraulic cylinder 30 driving separate A and B component sections through a yoke 32. Separate hoses 33, 35 deliver the A and B components, respectively, to the apparatus 10.

Figures 2, 3:
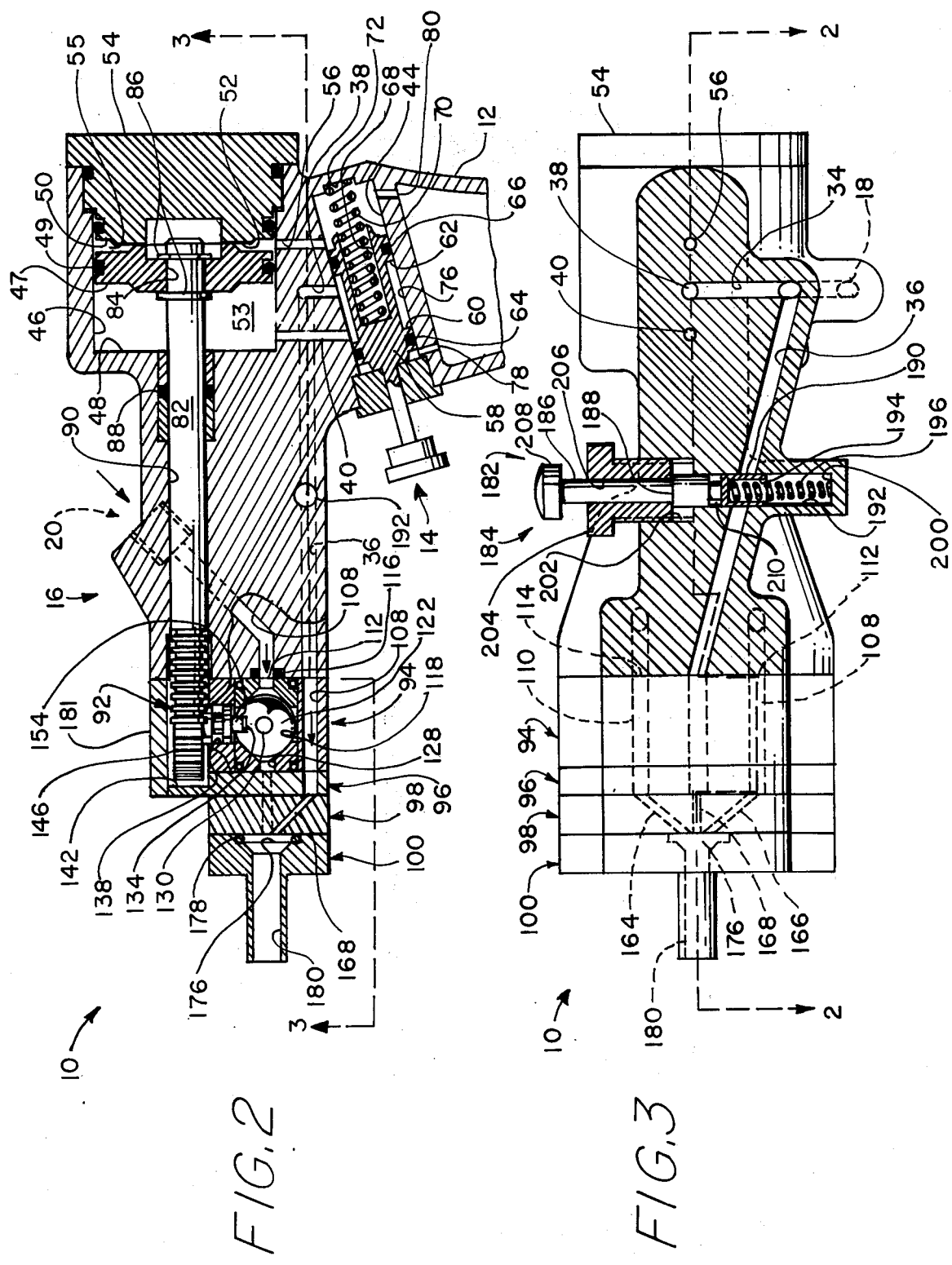
FIG. 2 is a fragmentary sectional side elevational view of a plural component mixing apparatus constructed according to the present invention.
FIG. 3 is a sectional view of the apparatus of FIG. 2 taken generally along section lines 3—3 thereof; and, FIG. 4 is a partly sectional exploded perspective view of a detail of the apparatus of FIGS. 1-3.

Referring now to FIGS. 2-3, air from inlet 18 is supplied through a manifold 34 to a forward-extending air passageway 36 and a downward-extending air passageway 38. An air passageway 40 extends upward from a generally cylindrically shaped trigger mechanism housing 44. As best illustrated in FIG. 3, passageway 40 does not intersect passageway 36. Upward-extending air passageway 40 extends through the wall of a cylinder 46 near the forward end 48 of cylinder 46. The rearward end 50 of cylinder 46 is defined by an end 52 of a large metal plug 54. An air passageway 56 extends upwardly from housing 44 and intersects cylinder 46 near the rearward end 50 thereof.

A piston 47 is reciprocably received in cylinder 46. Piston 47 includes a ring 49 which seals the piston to the wall of cylinder 46 and defines within cylinder 46 a forward chamber 53 and a rearward chamber 55.

Housing 44 houses a plunger-type trigger mechanism 58 which has enlarged annular forward and rearward portions 60, 62. Portions 60, 62 are grooved, and annular seals 64, 66 are mounted in the grooves in portions 60, 62, respectively. Mechanism 58 includes a rearwardly-opening cylindrical chamber 68 in which is located a coil spring 70. Spring 70 is positioned against the inside rear end 72 of housing 44 to urge mechanism 58 forward. With mechanism 58 in the forward position, a chamber 76 defined between the wall of housing 44 and mechanism 58, and between the forward and rearward portions 60, 62 connects passageway 38 to passageway 40, and thus to cylinder 46 in front of piston 47.

When trigger 14 is depressed, mechanism 58 is moved toward the rear end 72 of housing 44, and chamber 76 connects passageway 38 to passageway 56. Piston 47 is thereby forced toward the forward end 48 of cylinder 46. Air trapped in the forward chamber 53 of cylinder 46 is allowed to exhaust through passageway 40, housing 44, and an air passageway 78 formed in grip 12 in the forward lower side of housing 44.

When trigger 14 is released, mechanism 58 is returned by spring 70 to its forward position illustrated in FIG. 2, in which air from manifold 34 passes through air passageway 38, chamber 76 and passageway 40 to the forward end 48 of cylinder 46. Piston 47 is thereby forced to the rearward end 50 of cylinder 46 as air in rearward chamber 55 is exhausted through passageway 56 and the upper rearward portion of housing 44 and a passageway 80 provided in the bottom of the rearward end of housing 44.

As will be appreciated, actuation of trigger 14 thereby causes reciprocation of piston 47 in cylinder 46.

A rod 82 extends through an axial bore 84 in piston 47. Piston 47 is positioned on the end of rod 82 by a pair of split locking rings 86 which are situated in annular grooves provided on connecting rod 82. Rod 82 extends forward from piston 47 through a seal 88 and a longitudinally extending bore 90 provided in frame 16. Rod 82 is reciprocable in bore 90. The forward end of rod 82 is formed to provide a rack 92.

Referring now particularly to FIGS. 2 and 4, the structure of the forward end of frame 16 will be described in detail. The forward end of the frame includes a valve housing section 94, a valve retaining plate 96, an orifice plate 98 and an end plate 100. These portions are all attached to the forward end of frame 16 by a plurality of cap screws 102 (only one of which is illustrated in FIG. 4) which extend through each of portions 94-100 and connect these portions to the forward end of frame 16. This particular construction provides for rapid and easy disassembly of portions 94, 96, 98 and 100 from frame 16 when dispensing operations are not being conducted. This feature simplifies cleaning of these portions, since they can be placed in a tank of some suitable solvent when not in use and soaked. This feature also permits one or more of these portions to be replaced or "rotated" with duplicate portions in the event they become obstructed by a hardened mixture of components A and B.

Frame 16 further includes two fittings 104, 106 on top of the frame for connection of hoses 33, 35, respectively, (FIG. 1) thereto. Passageways 108, 110 extend downwardly and forwardly from fittings 104, 106, respectively, into frame 16. Passageways 108, 110 terminate in orifices 112, 114, respectively, (FIGS. 2 and 4). These orifices are surrounded by annular seals 116. Attachment of valve housing portion 94 to the end of frame 16 compresses seals 116. Housing portion 94 includes a pair of enlarged cylindrical openings 118, 120 which are axially aligned with orifices 112, 114, respectively. Each of openings 118, 120 houses a ball valve 122, 124, respectively, between a pair of facing, cup-shaped inserts 126. Axially extending passageways 128 are provided in all of the inserts 126, the passageways 128 being axially aligned with orifices 112, 114. Passageways 130, 132 extend diametrically through ball valves 122, 124, respectively. Passageways 130, 132 align with their respective passageways 128 in inserts 126 when valves 122, 124 assume a first orientation (illustrated in FIG. 4). Other orientations of valves 122, 124 move passageways 130, 132 out of alignment with passageways 128.

The spherically-shaped valves 122, 124 are provided with slots 134, 136 respectively. Slots 134, 136 open upwardly through openings 138, 140, respectively, in valve housing portion 94. Axially upwardly from openings 138, 140, cavities 142, 144 are provided in portion 94. Cavities 142, 144 both intersect longitudinal bore 90 along their adjacent sides. Cavities 142, 144 are sized to receive pinion gears 146, 148, respectively, with the teeth of these pinion gears meshing with rack 92 on connecting rod 82. Shafts 150 on pinion gears 146, 148 are provided with O-ring seals 152 to seal the shafts 150 and openings 138, 140. Shafts 150 are also provided with axially extending tongues 154 which are designed to fit into slots 134, 136. Rotation of pinion gears 146, 148 which results from reciprocation of connecting rod 82 turns ball valves 122, 124, respectively, to open passageways 130, 132 for material flow from apertures 112, 114 through openings 156, 158 in spacer plate 96.

An additional opening 160 in housing portion 94 is aligned with an opening 162 in valve retaining plate 96. These openings are aligned with air passageway 36 in frame 16 to supply air to the forward end of dispenser 10.

Orifice plate 98 includes passageways 164, 166, 168 which extend from openings 156, 158, 162, respectively, in valve retaining plate 96 forward and toward one another, terminating at orifices 170, 172, 174, respectively. Materials discharged from orifices 170, 172, 174 impinge against one another, resulting in considerable turbulence and mixing of these materials as they leave orifices 170, 172, 174. In the illustrated embodiment, the impingement angle between the streams of components A and B is between 100° and 180° and the orifice diameters are 0.060 inch. Desirably, for more viscous components A and B the orifice diameters will be made larger and the angle at which the component streams impinge against each other will also be larger. For less viscous components, the impingement angle and orifice diameters will be smaller.

End plate 100 includes a portion defining a mixing chamber 176 in which this impingement among the various materials dispensed through orifices 170, 172, 174 occurs. An annular seal 178 surrounds chamber 176 to seal it against leakage when end plate 100 and orifice plate 98 are bolted together. End plate 100 further includes a nozzle 180 which provides for a flow of mixture from mixing chamber 176 from apparatus 10. Housing portion 94 includes a gear cover 181 (FIG. 2) which bolts to the top of the housing to retain pinion gears 146, 148.

Actuation of trigger 14 provides a path between fittings 104, 106 and orifices 170, 172, for components A and B of the foam packaging material. A control 182, separate from trigger 14, is provided to supply air from passageway 36 to orifice 174. Separate control 182 is provided for the air system, since it may be desirable to use air as a purging medium for removing the two-component mixture from mixing chamber 176 after trigger 14 is released.

To this end, and with particular reference to FIG. 3, control 182 includes a trigger 184 having a shaft 186, a shoulder 188, and a valve 190. Shoulder 188 and valve 190 are slidably received in a bore 192 which extends generally transversely of frame 16 and intersects passageway 36 intermediate its end. Valve 190 includes a recessed rearward portion 194 which houses a coil spring 196. Spring 196 rests against the end 200 of bore 192. Spring 196 urges valve 190 into a position to prevent air flow through passageway 36. A threaded bore 202, which is substantially larger in diameter than stem 186 is coaxial with bore 192. A threaded adjustment nut 204 includes a bore 206 which reciprocably receives stem 186 and captures stem 186 between shoulder 188 and the operating button 208 on the end of stem 186. Button 208 can be pressed to provide a flow of air past the reduced diameter portion of stem 186 between shoulder 188 and valve 190. Further, continuous air flow through passageway 36 can be established by turning threaded adjustment nut 204 against shoulder 188 to place reduced diameter portion 210 in passageway 36. In this manner, continuous air flow can be achieved to mix air with components A and B as they are mixed, or to provide a continuous or intermittent air purge of mixing chamber 176 when components A and B are not being mixed.

Referring again to FIG. 1, in a typical application, apparatus 10 will be hand-held by an operator who will dispense some of the mixed components A and B into a container 220. Typically, container 220 will be a cardboard box. After a layer 222 of the mixture has been dispensed, and while this layer is still in a semi-liquid state, a layer 224 of flexible film is placed on top of layer 222 and an article 226 to be packaged is pressed onto layer 224, forming an indentation in layer 222. Another layer 228 of flexible film is then placed on top of article 226, and the operator of apparatus 10 dispenses an additional amount of mixed components A and B onto layer 228. The depth of this last layer 230 is sufficient so that when layer 230 cures, container 220 is substantially filled. Article 226 is thereby well protected for shipping.

What is claimed is:

1. A plural component dispensing apparatus comprising first means for supplying a first component, second means for supplying a second component, a housing for providing a cylinder, a piston disposed for reciprocation in the cylinder in response to fluid pressure on one side or the other thereof, a trigger for controlling fluid pressure in the cylinder, the trigger being movably mounted in the housing, a rod connected to the piston and reciprocable therewith, rack means provided on the rod, first and second rotary valve means for controlling the flow of the first and second components from the first and second supply means, respectively, at least a first pinion gear connected to the first and second valve means and engaging the rack means, reciprocation of the piston causing rotation of the first and second valve means between first orientations providing flows of the first and second components and second orientations blocking flow of the first and second components, the first and second valve means and pinion gear being attached to the housing and the housing being sized to be hand-held and operated.

2. The apparatus of claim 1 and further comprising an orifice plate including a first passageway for conducting flow of the first component from the first valve means and a second passageway for conducting flow of the second component from the second valve means, the first and second passageways converging and terminating at first and second orifices, respectively, to provide impinging streams of the first and second components, the orifice plate being removably mounted on the housing adjacent the first and second valve means.

3. The apparatus of claim 2 and further comprising a plate providing a mixing chamber, the first and second orifices opening into the mixing chamber for discharging the components thereinto, the mixing chamber plate being removably attached to the orifice plate.

4. The apparatus of claim 2 and further comprising third means for supplying a third medium, a third orifice in the orifice plate adjacent the first and second orifices, means in the housing for supplying the third medium to the third orifice, and third valve means for controlling flow of the third medium from the third orifice, the third valve means being controllable independently of the orientations of the first and second valve means.

5. A plural component dispensing apparatus comprising means for providing first and second flows of first and second components, respectively, means for providing a flow of an operating fluid, a housing for defining a cylinder, the first and second flow-providing means and operating fluid flow-providing means being connected to the housing, a piston disposed for reciprocation in the cylinder in response to operating fluid pressure on one side or the other thereof, trigger means for controlling operating fluid pressure in the cylinder, the trigger means being movably connected to the housing, a rod connected to the piston and reciprocable therewith, rack means provided on the rod, first and second valves for controlling the first and second flows, respectively, the rod and first and second valves being movably mounted in the housing, the housing defining a first passageway providing communication between the first flow-providing means and the first valve, a second passageway providing communication between the second flow-providing means and the second valve, and operating fluid passageways between the operating fluid flow-providing means and trigger means and between the trigger means and cylinder, the housing being hand-held, first and second pinion gears connected to the first and second valves, respectively, and engaging the rack means, reciprocation of the piston causing movement of the first and second valves between first orientations providing flows of the first and second components and second orientations blocking flow of the first and second components.

6. The apparatus of claim 5 and further comprising an orifice plate for providing flows of the first and second components from the first and second valves out of the housing, the orifice plate being removably attached to the housing adjacent the first and second valves, the orifice plate including a third passageway terminating in a first orifice and a fourth passageway terminating in a second orifice, the third passageway providing communication between the first valve and first orifice, and the fourth passageway providing communication between the second valve and second orifice, the first and second orifices being disposed to provide impinging streams of the first and second components.

7. The apparatus of claim 6 and further comprising a plate for providing a mixing chamber, the mixing chamber plate being removably attached to the orifice plate with the mixing chamber positioned to receive flows from the first and second orifices.

8. The apparatus of claim 6 wherein the orifice plate includes a third orifice, the housing further including a passageway for providing communication between the third orifice and the means for providing the flow of operating fluid, the apparatus further comprising a third valve for controlling operating fluid flow from the third orifice, the third valve being controllable independently of the orientations of the first and second valves.

9. A dispensing apparatus for plural component materials adapted to be hand-held, comprising a housing adapted to be connected with means to supply a flow of first and second components and an operating fluid and to be manipulated by hand, first and second valves carried by said housing to control the flow of said first and second components, respectively, a fluid-operated piston carried within a cylinder formed by said housing, first means operated by said piston and effecting operation of said first and second valves as said piston is moved between first and second positions by the pressure of said operating fluid, the first means including a rack, and at least one pinion gear engaging the rack and controlling the operation of the first and second valves, second means carried by said housing and adapted to mix the first and second components when flowing and to direct the mixed components from the housing, a trigger for controlling the movement of said piston, the trigger being carried by the housing for operation by hand, said trigger directing a flow of operating fluid to move the piston to said first position where said first means opens the valves to permit the first and second materials to flow through said dispenser for mixing and directed expulsion, and said second position where said first means closes the valves.

10. A plural component dispensing apparatus comprising means for providing flows of first and second components of a resin system reactive in the presence of a catalyst to harden rapidly, a first housing to which the first and second flow-providing means are attached, the housing including a first passageway for conveying the first component and a second passageway for conveying the second component, a valve housing for housing a first valve in communication with the first passageway and a second valve in communication with the second passageway, each of the first and second valves being movably housed in the valve housing for movement between first orientations in which the valves provide passage of the components therethrough and second orientations blocking passage of the components, the valve housing being removably attached to the first housing to provide for ready detachment of the valve housing for cleaning.

11. The apparatus of claim 10 and further comprising an orifice plate including third and fourth passageways terminating in first and second orifices respectively, the third passageway providing communication between the first valve and the first orifice and the fourth passageway providing communication between the second passageway and the second orifice, the orifice plate being removably attached to the valve housing to provide for ready detachment of the orifice plate from the valve housing for cleaning.

12. The apparatus of claim 10 and further comprising a mixing plate for providing a mixing chamber for the components, and means for providing communication between the first and second valves and the mixing chamber to provide first and second component flows thereto, the mixing plate being removably attached to the valve housing for ready detachment therefrom for cleaning of the mixing chamber.

13. A plural component dispensing apparatus comprising means for providing flows of first and second components, first and second valves for controlling flow on the first and second components, respectively, and means for controlling the first and second valves, the control means including a trigger, means for operatively connecting the trigger to the first and second valves so that actuation of the trigger moves the first and second valves to positions allowing flow of the first and second components, means for mixing the first and second components, said mixing means including a mixing chamber, first and second orifices from which the first and second components are ejected into the chamber in first and second streams which impinge against one another at an angle as the streams exit from the first and second orifices to mix the first and second components, third means for supplying a third medium, a third orifice adjacent the first and second orifices in the mixing chamber, means in the housing for supplying the third medium to the third orifice, a third valve for controlling flow of the third medium from the third orifice, and means for controlling the third valve independently of the orientations of the first and second valves, and a nozzle for providing a stream of the mixed components from their point of inpingement out of the chamber, the control means for the first and second valves comprising first and second pinion gears coupled to the first and second valves, respectively, and rack means engaging the first and second pinion gears.

14. The dispensing apparatus of claim 13 wherein the first and second valves comprise first and second rotatable valve members, respectively, each of the valves further including a valve member retainer, each rotatable valve member including means defining a passageway providing a path for component flow through the rotatable member to a respective one of the first and second orifices when the rotatable member is in a first orientation and for blocking such component flow when the rotatable member is in a second orientation.

15. The dispensing apparatus of claim 14 wherein each of the pinion gears includes a stem having a tongue and the rotatable members include grooves for receiving the tongues for connecting each of the stems to a respective one of the rotatable members.

16. The apparatus of claim 15 wherein said means for controlling the third valve includes a second trigger and means for urging the second trigger toward a third valve closing position.

17. The apparatus of claim 16 and further including an adjustable stop for selectively holding the second trigger away from the third valve closing position to maintain a selected flow of the third medium from the third orifice when the second trigger is released.

* * * * *